United States Patent
Lee

(10) Patent No.: US 8,519,957 B2
(45) Date of Patent: Aug. 27, 2013

(54) METHOD FOR SIMULATING A MOUSE DEVICE WITH A KEYBOARD AND INPUT SYSTEM USING THE SAME

(75) Inventor: Yuan-Chan Lee, New Taipei (TW)

(73) Assignee: Wistron Corporation, Xizhi Dist., New Taipei (TW)

( * ) Notice: Subject to any disclaimer, the term of this patent is extended or adjusted under 35 U.S.C. 154(b) by 239 days.

(21) Appl. No.: 13/233,035

(22) Filed: Sep. 15, 2011

(65) Prior Publication Data

US 2012/0075187 A1    Mar. 29, 2012

(30) Foreign Application Priority Data

Sep. 24, 2010    (TW) .............................. 99132338 A

(51) Int. Cl.
*G09G 5/08*    (2006.01)

(52) U.S. Cl.
USPC ............................ 345/163; 345/157; 345/168

(58) Field of Classification Search
None
See application file for complete search history.

(56) References Cited

U.S. PATENT DOCUMENTS

| | | | | |
|---|---|---|---|---|
| 6,100,875 A | * | 8/2000 | Goodman et al. | 345/163 |
| 6,469,694 B1 | * | 10/2002 | Mikan | 345/168 |
| 6,795,055 B1 | * | 9/2004 | Culler | 345/157 |
| 7,659,887 B2 | * | 2/2010 | Larsen et al. | 345/170 |
| 8,471,814 B2 | * | 6/2013 | LaFave et al. | 345/160 |

FOREIGN PATENT DOCUMENTS

TW    200707490    2/2007

OTHER PUBLICATIONS

Office action mailed on May 20, 2013 for the Taiwan application No. 099132338, filing date: Sep. 24, 2010, p. 1 line 13~14, p. 2~6 and p. 7 line 1~14.

\* cited by examiner

*Primary Examiner* — Jason Olson
(74) *Attorney, Agent, or Firm* — Winston Hsu; Scott Margo

(57)    ABSTRACT

A method for simulating a mouse with a keyboard in a computer system includes detecting whether a key event occurs in a switch matrix of the keyboard of the computer system, determining whether the key event is related to a specific control key when the key event is detected, transforming a location of a switch in which the key event occurs into a pair of coordinates when the key event is not related to the specific control key and is a key-pressed event, calculating a pair of displacements between the latest two pairs of coordinates to obtain a movement data, and transmitting the movement data to a mouse driver of the computer system so that an operating system of the computer system is capable of receiving the movement data by the mouse driver, for controlling movement of a pointer shown on a screen of the computer system.

12 Claims, 4 Drawing Sheets

METHOD FOR SIMULATING A MOUSE DEVICE WITH A KEYBOARD AND INPUT SYSTEM USING THE SAME

BACKGROUND OF THE INVENTION

1. Field of the Invention

The present invention relates to a method and input device of simulating a mouse with a keyboard, more particularly, to a method and input device of simulating movement of the pointer controlled by the mouse via pressing keys in the keyboard.

2. Description of the Prior Art

Keyboard, mouse, and touchpad are standard input devices equipped by a laptop. Please refer to FIG. 1. FIG. 1 is a schematic diagram of an input device 10 according to prior art. The input device 10 is used by a laptop and includes a keyboard 100, a mouse 102 and a touchpad 104. The keyboard 100 is a switch matrix composed of multiple switches, and a keyboard controller 106 detects a press of each key and outputs a detection result to an operating system 120 by a keyboard driver 110. The mouse 102 includes components as buttons, a scroll wheel and a motion sensor, etc, and a built-in controller detects a trigger of each component and outputs a detection result to the operating system 120 by a mouse driver 112. The touchpad 104 is composed of touch components arranged in a matrix, and a touchpad controller 108 detects a touch of each component and outputs a detection result to the operating system 120 by a touchpad driver 114.

In detail, after a user selects English as a language of the keyboard 100, when one of the keys is pressed, the keyboard controller 106 detects a location of a switch in the switch matrix corresponding to the pressed key, obtains a scan code related to the location of the switch according to the keyboard scan code table related to the language of the keyboard 100, and outputs the scan code to the keyboard driver 110. A key-pressed event and a key-released event are related to different scan codes respectively. Afterwards, the keyboard driver 110 translates the scan code into a key code which is capable of being processed by the operating system 120. Since each character or symbol has its related scan code, the operating system 120 can obtain the input character or symbol according to the key code generated by the key driver 110, for calculating or displaying correctly. In addition, when the user moves the mouse 102, the built-in controller receives a movement data in X-Y axes of the mouse 102 and then transmits the movement data to the mouse driver 112. The operating system 120 receives the movement data of the mouse 102 by the mouse driver 110 and control movement of a pointer shown on a screen of the laptop. When the user controls movement of the pointer by using the touchpad 104 with fingers, the touchpad controller 108 receives the movement data in X-Y axes generated by fingers of the user on the touchpad 104 so that the operating system 120 controls movement of the pointer shown on the screen.

The touchpad provides the same function as the mouse and can replace the mouse to increase convenience for using the laptop. However, the touchpad occupies large area on the laptop. For the touchpad settled under the keyboard, even though the user does not use the touchpad, the user may touch the touchpad while using the keyboard, which causes incorrect movement of the pointer. Therefore, placement of the touchpad is a key point to develop a miniature and functional laptop.

SUMMARY OF THE INVENTION

It is therefore an objective of the present invention to provide a method and input device of simulating a mouse for a keyboard.

The present invention discloses a method for simulating a mouse with a keyboard in a computer system. The method comprises detecting whether a key event occurs in a switch matrix of the keyboard of the computer system; determining whether the key event is related to a specific control key when the key event is detected; transforming a location of a switch in which the key event occurs into a pair of coordinates when the key event is not related to the specific control key and is a key-pressed event; calculating a pair of displacements between the latest two pairs of coordinates to obtain a movement data; and transmitting the movement data to a mouse driver of the computer system so that an operating system of the computer system is capable of receiving the movement data by the mouse driver, for controlling movement of a pointer shown on a screen of the computer system.

The present invention further discloses an input device for a computer system. The input device comprises a keyboard and a keyboard controller. The keyboard controller is coupled to the keyboard and the computer system and is utilized for detecting whether a key event occurs in a switch matrix of the keyboard; determining whether the key event is related to a specific control key when the key event is detected; transforming a location of a switch in which the key event occurs into a pair of coordinates when the key event is not related to the specific control key and is a key-pressed event; calculating a pair of displacements between the latest two pairs of coordinates to obtain a movement data; and transmitting the movement data to a mouse driver of the computer system so that an operating system of the computer system is capable of receiving the movement data by the mouse driver, for controlling movement of a pointer shown on a screen of the computer system.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
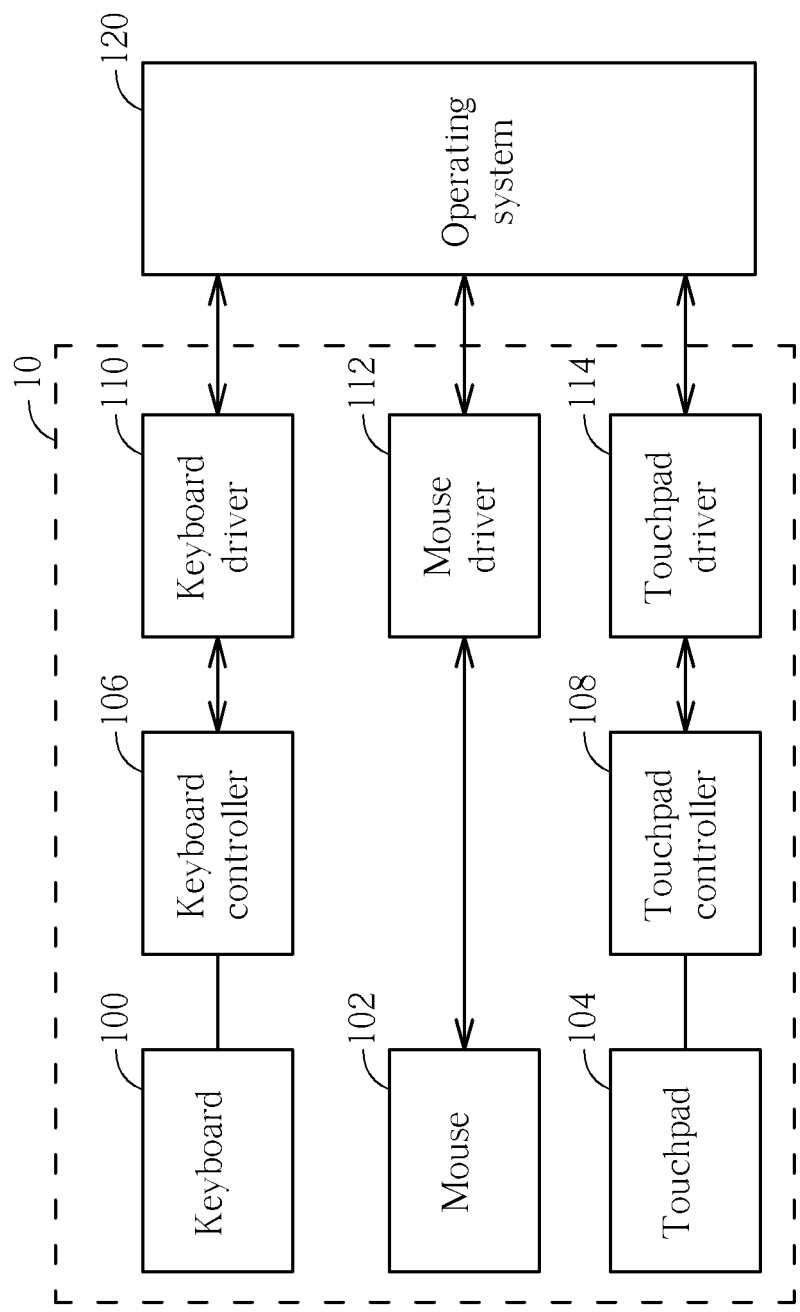
FIG. 1 is a schematic diagram of an input device according to the prior art.
Figure 2:
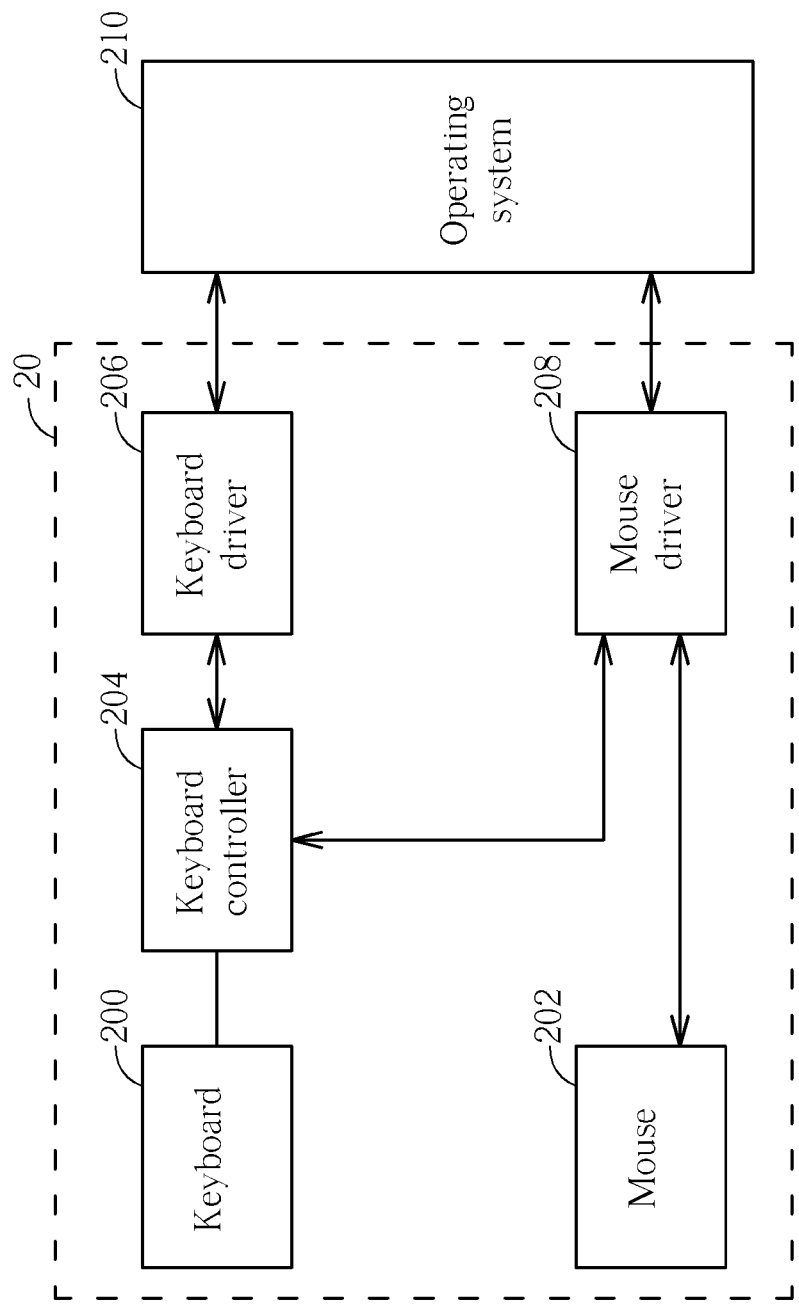
FIG. 2 is a schematic diagram of an input device according to an embodiment of the present invention.

Please refer to FIG. 2. FIG. 2 is a schematic diagram of an input device 20 according to an embodiment of the present invention. The input device 20 is used in a computer and includes a keyboard 200 and a mouse 202. The mouse 202 is removable from the computer, and the keyboard 200 is capable of simulating an operation of the mouse 202. Therefore, the input device 20 without a touchpad used for replacing the mouse 202 is able to miniaturize dimensions of the computer.

In the input device 20, the keyboard 200 is composed of a switch matrix, and a keyboard controller 204 transforms a signal generated by each key pressed and released in the keyboard 200 into a scan code according to a keyboard scan code table and outputs the scan code to a keyboard driver 206. The keyboard driver 206 is used for driving the keyboard controller 204 and translating the scan code into a key code, which is capable of being processed by an operating system 210 for controlling the computer. The abovementioned is the operation of a general input function of the keyboard 200 and is well known to those skilled in the art. In addition, the mouse 202 includes components as buttons, a scroll wheel and a motion sensor, etc., and a built-in controller detects a trigger status of each component. A mouse driver 208 is used for driving the mouse 202. When the mouse 202 moves, the built-in controller of the mouse 202 outputs a movement data in X and Y axes to the mouse driver 208, and thereby the operating system 210 controls movement of a pointer shown on a screen of the computer according to the movement data in X and Y axes of the mouse 202.

Note that, the keyboard controller 204 is further used for transforming a location of a switch of each key of the keyboard 200 within a predefined operating area into a pair of coordinates in X and Y axes, which represents a location on physical plane. Abovementioned transformation can be obtained by a table recording the location of each switch and the corresponding XY coordinates. However, this should not be construed as a limit to the present invention. After receiving two pairs of XY coordinates corresponding to two keys pressed continuously, the keyboard controller 204 calculates a pair of XY displacements between the two pairs of XY coordinates to obtain the movement data in X and Y axes, and outputs the movement data to the mouse driver 208. The format used by the movement data outputted from the keyboard controller 204 is the same as that used by the movement data outputted from the mouse 202. The mouse driver 208 only needs to transmit the received movement data to the operating system 210 so that the operating system 210 controls movement of the pointer on the screen according to the movement data, whether the movement data is generated from the mouse 202 or the keyboard controller 204.

Figure 3:
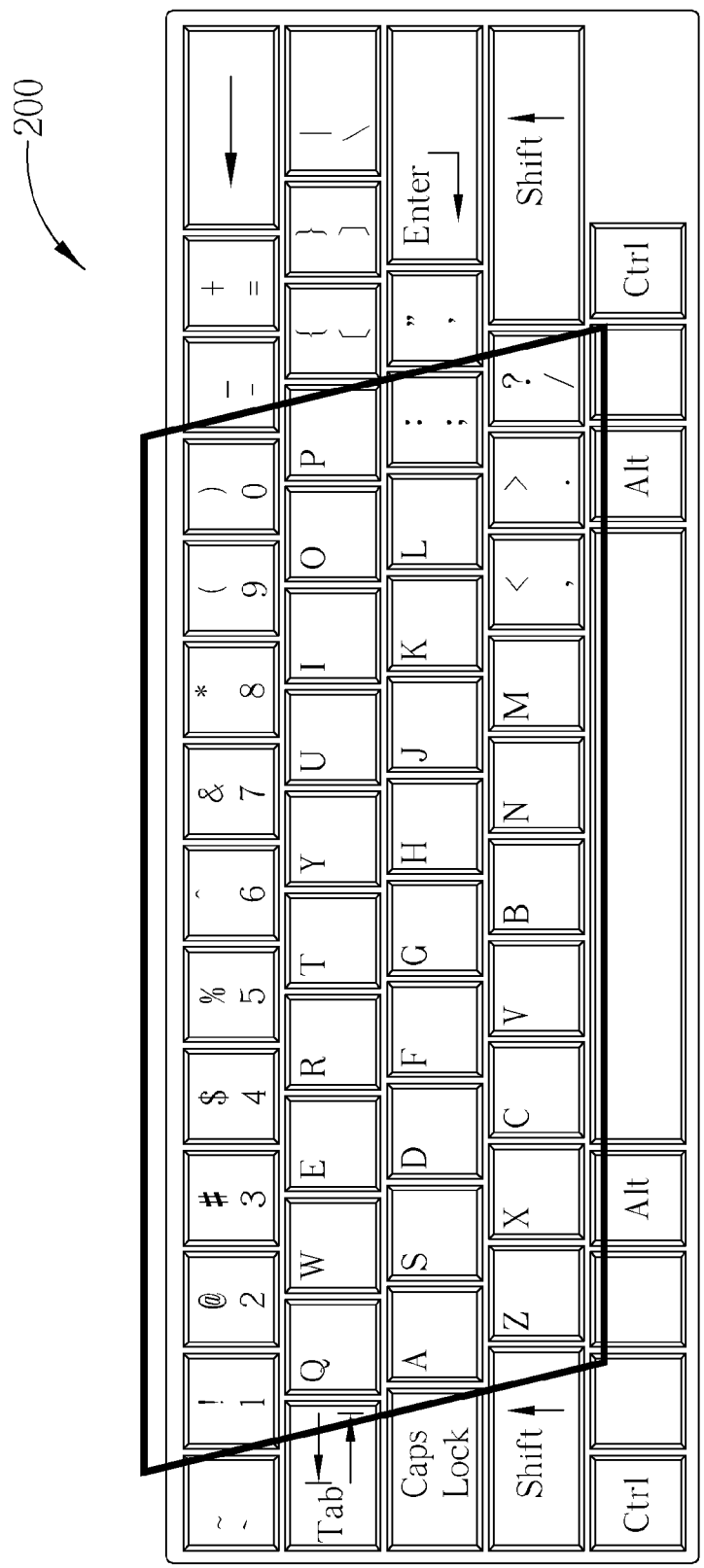
FIG. 3 is a layout diagram of the keyboard in FIG. 2.

In order to simulate a mouse by the keyboard 200, one key of the keyboard 200 can be set as a function key for activating and deactivating a mouse simulation. When the user slides keys of the keyboard 200 as the touchpad operation, the keyboard controller 204 outputs the movement data in X and Y axes to the mouse driver 208 so that the operating system 210 controls movement of the pointer on the screen. Please refer to FIG. 3. FIG. 3 is a layout diagram of the keyboard 200. The operating area used for simulating the mouse has a range represented by bold lines and includes keys with uniform size for sliding keys more fluently to avoid the keyboard controller 204 from generating the movement data with more inaccuracy.

For example, if the pointer shown on the screen is located at a point A and the mouse simulation function of the keyboard 200 is activated. When 'X', 'D', 'F', 'R' and 'T' keys of the keyboard 200 are pressed sequentially, the keyboard controller 204 transforms positions of switches of 'X', 'D', 'F', 'R' and 'T' keys sequentially into pairs of XY coordinates as (2,2), (3,2), (4,3) and (4,4), and thereby generates pairs of XY displacements (1,0), (1,1) and (0,1) as the movement data. After the abovementioned movement data are processed by the operating system 210, the pointer is controlled to move from the point A to right, to right upward and further upward to a point B. The keyboard controller 204 calculates the movement data according to two pairs of XY coordinates received continuously. Therefore, the user is able to only press two keys corresponding to a starting position and an ending position of the pointer sequentially, and the pointer is directly moved to the ending position. From the previous example, the pointer is moved from the point A to the point B when 'X' and 'T' keys are pressed sequentially.

Further, in order to fully simulate the mouse, the keyboard 200 may include keys for simulating mouse control keys, i.e. the left, middle and right buttons of the mouse 202. For example, in the operating area shown in FIG. 3, the left Alt key may be used for simulating the left button of the mouse, the space bar may be used for simulating the middle button of the mouse, and the right Alt key may be used for simulating the right button of the mouse. When the keyboard controller 204 detects a press on the keys simulating the left, middle or right button of the mouse 202, the keyboard controller 204 transmits the related control data to the mouse driver 208, and therefore, the operating system 210 is capable of performing related operations.

Figure 4:
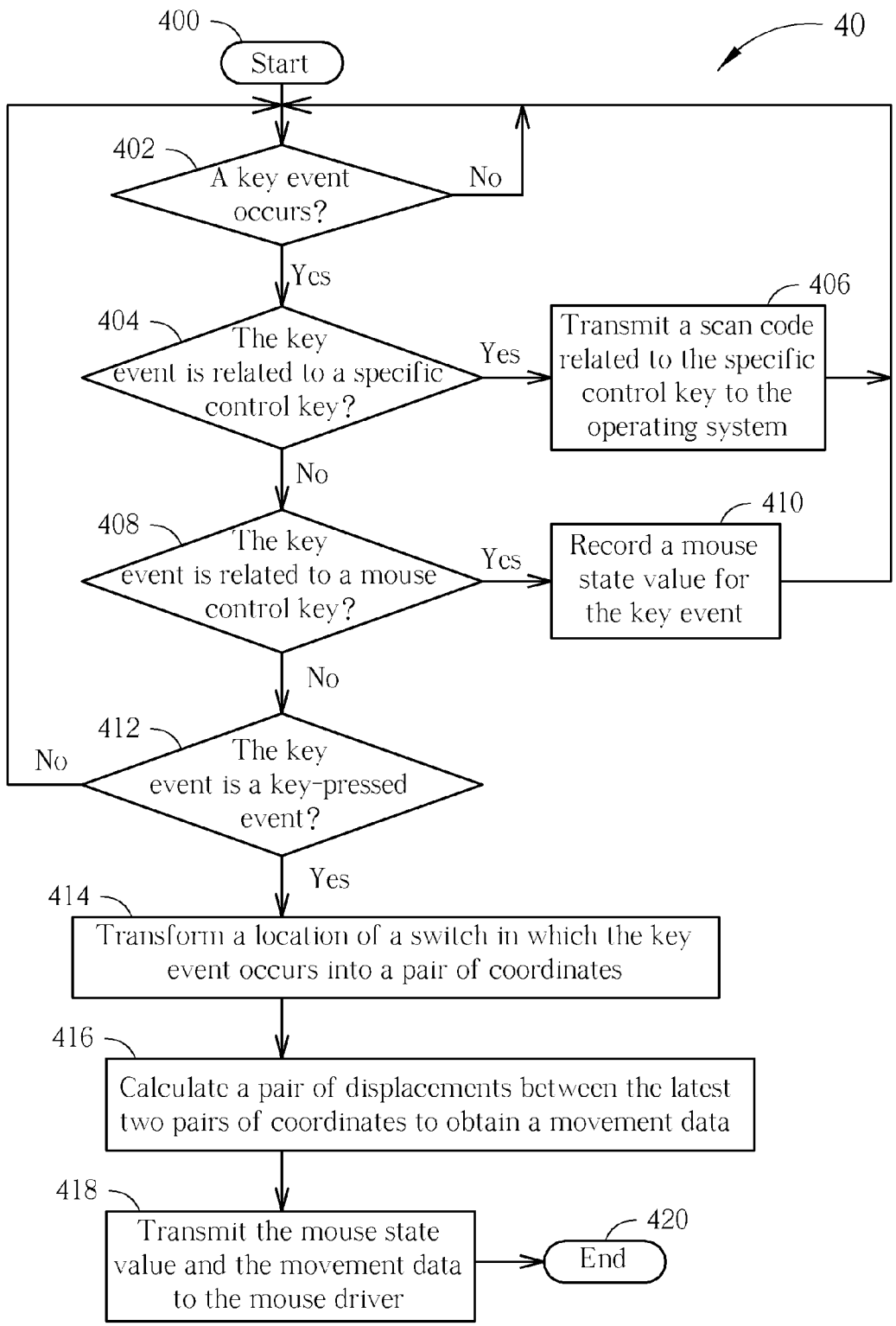
FIG. 4 is a flowchart of a process according to an embodiment of the present invention.

Please refer to FIG. 4 for detailed operations of the keyboard controller 204 to control the keyboard 200 for simulating the mouse. FIG. 4 is a flowchart of a process 40 according to an embodiment of the present invention. The process 40 is the process used by the keyboard controller 204 and includes following steps:

Step 400: Start.

Step 402: Detect whether a key event occurs in a switch matrix of the keyboard 200. If yes, perform the step 404; otherwise, perform the step 402.

Step 404: Determine whether the key event is related to a specific control key used by the operating system 210. If yes, perform the step 406; otherwise, perform the step 408.

Step 406: Transmit a scan code related to the specific control key to the operating system 210.

Step 408: Determine whether the key event is related to a mouse control key. If yes, perform the step 410; otherwise, perform the step 412.

Step 410: Record a mouse state value for the key event and return to the step 402.

Step 412: Determine whether the key event is a key-pressed event. If yes, perform the step 414; otherwise, perform the step 402.

Step 414: Transform a location of a switch in which the key event occurs into a pair of coordinates.

Step 416: Calculate a pair of displacements between the latest two pairs of coordinates to obtain a movement data.

Step 418: Transmit the mouse state value and the movement data to the mouse driver 208.

Step 420: End.

The keyboard controller 204 scans all switches in the switch matrix of the keyboard 200 periodically. For example, a keyboard controller in a general PS/2 standard keyboard uses a frequency around 30 KHz to scan all switches to detect whether a key event occurs in the switch matrix of the keyboard 200. The key event may be a key-pressed event or a key-released event related to the on/off state of the switch of the key.

The step 404 to the step 420 are performed when the mouse simulation activated by the keyboard 200. When detecting a key event, the keyboard controller 204 determines whether the key event is related to a control key used by the operating system 210, e.g. Shift key or Esc key, according to the step 404. When the key event is related to the control key, i.e. the pressed or released key is the control key, the keyboard controller 204 transmits a scan code related to the control key to the operating system 210 according to the step 406. In other words, when the mouse simulation activated by the keyboard 200, the control key used by the operating system 210 is still utilized for performing the original assignment and not for the mouse simulation. After transmitting the scan code, the keyboard controller 204 continuously detects whether a next key event occurs.

When the key event is not related to the control key used by the operating system 210, i.e. the pressed or released key is not the control key, the keyboard controller 204 further determines whether the key event is related to the mouse control key, i.e. whether the pressed or released key is set for the mouse control keys according to the step 408. The mouse control keys are keys that simulate the left, middle and right buttons of the mouse. When the key event is related to the mouse control key, the keyboard controller 204 records a mouse state value for the key event according to the step 410. The mouse state value is capable of representing the key pressed or released, e.g. represent by '0' or '1'. After recording the mouse state value, the keyboard controller 204 continuously detects whether a next key event occurs. Above-mentioned step 404 and step 408 can be summed up to a step of determining whether the key event is related to a specific control key.

Further, when the key event is neither related to the control key used by the operating system 210 nor related to any of the mouse control keys, which means that the pressed or released key is located in the operating area for simulating movement of the mouse in the keyboard 200, the keyboard controller 204 determines whether the key event is the key-pressed event according to the step 412. When the key event is the key-pressed event, the keyboard controller 204 performs the step 414 to the step 418. When the key event is not the key-pressed event and is the key-released event, the keyboard controller 204 returns to perform the step 402 for detecting next key event.

The step 414 to the step 418 are main steps of the keyboard 200 to simulate the mouse. The keyboard controller 204 transforms the position of the switch in which the key event occurs into a pair of XY coordinates. Take FIG. 3 for an example. If the position of the switch of 'F' key is (Column 3, Row 12), when 'F' key is pressed, 'F' key sends a voltage signal to the keyboard controller 204 so that the keyboard controller knows that the pressed switch is in the position (Column 3, Row 12) according to the voltage signal and transforms the position (Column 3, Row 12) into XY coordinates (4, 6). Please note that, the keyboard controller 204 can not recognize characters or functions represented by the pressed or released key. Instead, the keyboard controller 204 recognizes each key by the position of the corresponding switch in the circuit, and the position of the switch is not related to the position of physical key recognized by the user. For this reason, the keyboard controller 204 performs a coordinate transformation of the step 414 for receiving related coordinates continuously for simulating movement of the mouse or the finger tracking on the touchpad.

After receiving coordinates (x, y) related to the pressed key, the keyboard controller 204 calculates a pair of XY displacements of the latest two pairs of XY coordinates, i.e. (x, y) and (x0, y0) previously received, to obtain (x−x0, y−y0) as a movement data, and transmits the movement data to the mouse driver 208. Please note that, the format used by the movement data transmitted from the keyboard controller 204 is the same as that used by the movement data transmitted from the mouse driver 208. Take a mouse complying with PS/2 standard for an example, movement data transmitted to the mouse driver 208 includes 1 byte of an X-axis displacement, 1 byte of a Y-axis displacement and 3 bits of mouse state value of the left, middle and right buttons of the mouse. Thus, the keyboard controller 204 transmits displacement data (x−x0) and (y−y0) to the mouse driver 208.

According to the step 418, except transmitting the movement data, the keyboard controller 204 transmits the mouse state values to the mouse driver 208 as well. Therefore, via the mouse driver 208, the operating system 210 receives the mouse state values and the movement data that are similar to those outputted by the mouse 202, and moves the pointer shown on the screen of the computer to a corresponding position and performs related operations of the mouse control key. Note that, the step 404 to the step 420 of the process 40 are performed when the mouse simulation is activated. When the process 40 is being performed and the user operates related function keys to stop the mouse simulation, the process 40 is stopped immediately, and the keyboard 200 and the keyboard controller 204 return to perform the general character input function as in prior art.

As a well-known in the art, the sensitivity of the mouse is able to be adjusted by the operating system of the computer according to requirement of the user, to response the velocity of pointer movement. Note that, the important points of the input device 20 in FIG. 2 and the process 40 in FIG. 4 are using the keyboard controller to transform the key events generated continuously into coordinates to generate the movement data outputted to the mouse driver. The operations of the mouse driver and the operating system are the same as that in prior art. Thus, the velocity of pointer movement that is controlled by using the process 40 is able to be adjusted as prior art by the operating system 210.

With the process and computer system according to the present invention, the keyboard of the computer is capable of simulating the mouse and the touchpad is no more required in the computer, which brings great advantages for the computer miniaturization.

Those skilled in the art will readily observe that numerous modifications and alterations of the device and method may be made while retaining the teachings of the invention.

What is claimed is:

1. A method for simulating a mouse with a keyboard in a computer system, the method comprising:
   detecting whether a key event occurs in a switch matrix of the keyboard of the computer system;
   determining whether the key event is related to a specific control key when the key event is detected;
   transforming a location of a switch in which the key event occurs into a pair of coordinates when the key event is not related to the specific control key and is a key-pressed event;
   calculating a pair of displacements between the latest two pairs of coordinates to obtain a movement data; and
   transmitting the movement data to a mouse driver of the computer system so that an operating system of the computer system is capable of receiving the movement data by the mouse driver, for controlling movement of a pointer shown on a screen of the computer system.

2. The method of claim 1, wherein the specific control key is a control key used by the operating system.

3. The method of claim 1, wherein the specific control key is a mouse control key.

4. The method of claim 1 further comprising:
   transmitting a scan code related to the specific control key to the operating system when the key event is related to the specific control key and the specific control key is used by the operating system.

5. The method of claim 1 further comprising:
   recording a mouse state value for the key event when the key event is related to the specific control key and the specific control key is used for a mouse control key.

6. The method of claim 5 further comprising:
   transmitting the mouse state value to the mouse driver while transmitting the movement data to the mouse driver.

7. An input device for a computer system comprising:
   a keyboard; and a keyboard controller, coupled to the keyboard and the computer system, for:

detecting whether a key event occurs in a switch matrix of the keyboard;

determining whether the key event is related to a specific control key when the key event is detected;

transforming a location of a switch in which the key event occurs into a pair of coordinates when the key event is not related to the specific control key and is a key-pressed event;

calculating a pair of displacements between the latest two pairs of coordinates to obtain a movement data; and transmitting the movement data to a mouse driver of the computer system so that an operating system of the computer system is capable of receiving the movement data by the mouse driver, for controlling movement of a pointer shown on a screen of the computer system.

8. The input device of claim 7, wherein the specific control key is a control key used by the operating system.

9. The input device of claim 7, wherein the specific control key is a mouse control key.

10. The input device of claim 7, wherein the keyboard controller is utilized for transmitting a scan code related to the specific control key to the operating system when the key event is related to the specific control key and the specific control key is used by the operating system.

11. The input device of claim 7, wherein the keyboard controller is utilized for recording a mouse state value for the key event when the key event is related to the specific control key and the specific control key is used for a mouse control key.

12. The input device of claim 11, wherein the keyboard controller is utilized for transmitting the mouse state value to the mouse driver while transmitting the movement data to the mouse driver.

* * * * *